United States Patent
Zhong et al.

(10) Patent No.: US 8,254,337 B2
(45) Date of Patent: Aug. 28, 2012

(54) METHOD AND APPARATUS FOR POWER MANAGEMENT IN HANDOVER BETWEEN HETEROGENEOUS NETWORKS

(75) Inventors: Hui Zhong, Shenzhen (CN); Yi Zhou, Shenzhen (CN); Yuan Liu, Shenzhen (CN); Guiming Shu, Shenzhen (CN); Shu Wang, Shenzhen (CN); Peiying Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1086 days.

(21) Appl. No.: 12/133,840

(22) Filed: Jun. 5, 2008

(65) Prior Publication Data
US 2008/0318580 A1 Dec. 25, 2008

Related U.S. Application Data

(63) Continuation of application No. PCT/CN2006/002381, filed on Sep. 13, 2006.

(30) Foreign Application Priority Data

Dec. 6, 2005 (CN) .......................... 2005 1 0127602

(51) Int. Cl.
*H04W 4/00* (2009.01)
(52) U.S. Cl. ........ 370/332; 455/443; 455/436; 455/437; 455/439; 455/572; 370/331; 370/337
(58) Field of Classification Search .................. 455/443, 455/436, 437, 439, 572; 370/331, 332, 337
See application file for complete search history.

(56) References Cited

U.S. PATENT DOCUMENTS

| | | | |
|---|---|---|---|
| 2002/0141544 A1* | 10/2002 | Brown et al. | 379/29.01 |
| 2005/0249161 A1 | 11/2005 | Carlton | |
| 2006/0140150 A1* | 6/2006 | Olvera-Hernandez et al. | 370/331 |

FOREIGN PATENT DOCUMENTS

CN 1595886 A 3/2005

OTHER PUBLICATIONS

Chinese Office Action, translation provided by Huawei Technologies Co., Ltd.
IEEE 802.21 Media Independent Handover, MIH Power Event, Dec. 5, 2005.
IEEE 802.21 Media Independent Handover, The Amendment for the Link Going Down Primitive, Dec. 5, 2005.
International Search Report for International Application No. PCT/CN2006/002381, dated Dec. 12, 2006, with English translation.

* cited by examiner

*Primary Examiner* — Wayne Cai
*Assistant Examiner* — Chuck Huynh
(74) *Attorney, Agent, or Firm* — Harness, Dickey & Pierce, P.L.C.

(57) ABSTRACT

A method for power management in handover between heterogeneous networks comprising: an MIH layer obtains power information and provides it for an MIH user layer; the MIH user layer determines the handover policy according to the power information. In various embodiments of the disclosure, the MIH layer triggers an event so that the MIH user layer can obtain power information, and select a lower-layer network connection automatically according to the current power status, thus implementing handover; the MIH user layer sends a query request to the MIH layer to obtain power consumption parameters from the network, and selects a lower-layer network connection according to the power consumption and the current power status, thus implementing handover and making more accurate and effective decisions in the handover.

27 Claims, 7 Drawing Sheets

METHOD AND APPARATUS FOR POWER MANAGEMENT IN HANDOVER BETWEEN HETEROGENEOUS NETWORKS

CROSS-REFERENCE TO RELATED APPLICATIONS

This application is a continuation of International Application No. PCT/CN2006/002381, filed Sep. 13, 2006. This application claims the benefit of Chinese Application No. 200510127602.4, filed Dec. 6, 2005. The disclosures of the above applications are incorporated herein by reference.

FIELD

The present disclosure relates to power management in a communication network, and in particular, to a method and apparatus for power management in handover between heterogeneous networks.

BACKGROUND

The statements in this section merely provide background information related to the present disclosure and may not constitute prior art.

At present, a communication system covers networks of different architectures, for example, 802.11, 802.16, and 3rd Generation Partnership Project (3GPP). Networks of different architectures are called "heterogeneous networks."

The IEEE 802.21 (Media Independent Handover Services) protocol provides the link layer information in a heterogeneous network and other relevant network information for the upper layer; the upper layer optimizes handover policies, ensuring that the continuity of the current services is not affected when a terminal is handed over or roams in a heterogeneous network. The IEEE 802.21 protocol supports multiple heterogeneous networks, including IEEE 802.3, IEEE 802.11, IEEE 802.16, 3GPP and 3GPP2, and supports handover of mobile and fixed users and collaboration between a terminal device and a network device.

The IEEE 802.21 protocol defines a mobile node (MN), and provides an architecture that enables transparent service continuity in the case of handover at the link layer in a heterogeneous network. This protocol is based on a mobility management protocol stack within network elements that support the handover. The mobility management protocol stack defines: a group of handover-dependent functions and a new entity named media independent handover function (MIHF) that corresponds to the media independent handover (MIH) layer in the network hierarchy; a group of media-independent service access points (SAPs) and MIHF access related primitives such as media independent event service (MIES), media independent command service (MICS) and media independent information service (MIIS); and media access control (MAC) layer SAPs and relevant primitives intended for each specific access technology. Through the SAPs, the MIHF exchanges messages with other layers and functional planes.

The MIES supports local events and remote events of the same media type. Local events are propagated by the MAC or a radio link to the MIH protocol or Layer 3 Mobility Management Protocol (L3MP) of the local protocol stack. The local protocol stack is located at an access point (AP) or a base station (BS) on the mobile terminal or the network. Remote events are propagated from MIH or L3MP to peer MIH or peer L3MP. The remote events between different media protocol stacks are not supported. An event may indicate the change of a transmission behavior of the data link layer in MAC, predict the status transition, or indicate a network management behavior or command. Sources of an event include the data link layer in MAC, the physical layer (PHY) and the MIHF. Destinations of an event include the MIH of the local protocol stack and/or the MIH of the remote protocol stack. A destination of an event adopts the dynamic registration mechanism and can register a specific event. An event may carry additional context data. Important events include: Link Up (a link setup indication event, sent when a MAC link is set up at a specified link interface and an upper-layer packet can be sent by the L3MP and other upper layers), Link Down (a link break indication event, sent when a MAC link is broken at a specified link interface and no packet is sent on the specified link), Link Detected (a new link is detected), and Link Handover Imminent (link handover is imminent).

The media independent command service (MICS) is adapted for a user to issue commands to control the handover-related link behaviors. The commands are issued from an upper layer to a lower layer in the reference model, including: commands from an upper layer to MIH (from L3MP to MIH, or from a policy engine to MIH), and commands from MIH to its lower layer (from MIH to MAC, or from MIH to PHY). The commands may be issued from a local MIH entity to a remote MIH entity. A command contains decisions made by an upper layer about the lower layers of a local device entity and a remote entity, and is adapted to control behaviors of the lower layers. Important commands include: MIH Capability Discover (adapted to obtain the MIH capabilities of an unused link), MIH Scan (adapted for an upper layer to obtain information about the currently connected or potentially available link), MIH Switch (adapted for an upper layer to hand over an active session from one link to another), MIH Configure (originated by an upper layer to control the behaviors of a lower layer), and MIH Scan (adapted for an upper layer to discover the adjacent POA information).

The media independent information service (MIIS) provides a group of information elements, presenting queries/requests in specified information structures and through specified information transmission mechanisms. Information may be stored in an MIHF entity or an information server (IS) accessible to the MIHF. The network information service capability is accessible through a specific format. The structure and the definition of this format may be presented in an advanced language such as Extensible Mark-up Language (XML). Information services may access static information such as a neighbor information report, which is helpful for network discovery, and may provide dynamic information to optimize the link layer connection between different networks, including link-layer parameters such as channel information, MAC address and security information. Important information includes: Data_Rates (data rate), Location_Lat-Long (location of the POA, longitude and latitude information), Networks_supported (network types supported by the POA, for example, 802.3, 802.11a, 802.11b, 802.11g, 802.16a, 802.16d, 802.16e, GSM, GPRS, W-CDMA, CDMA2000), and Quality_of_Service (QoS parameter).

FIG. 1 shows an architecture of a heterogeneous network based on the IEEE 802.21 protocol. As shown in FIG. 1, an MIH-enabled terminal is connected to four access networks (WLAN, Wimax, cellular network and wired 802.3 network). The services available from the MIH layer assist the L3MP and other protocol layers in terms of keeping service continuity, adapting to change of QoS, managing battery power, network discovery and network selection, assist the mobile devices in seamless handover between heterogeneous networks, and support upper layer protocols such as Mobile IP to ensure handover and continuity of the session process.

FIG. 2 shows the hierarchy of a heterogeneous network in the prior art. As shown in FIG. 2, a heterogeneous network includes: an access layer 201 consisting of a physical layer and a link layer, an MIHF layer 202, an MIH user layer 203 and a network management entity 204. As a lower layer of the network, the access layer 201 includes an 802.2 or 802.3 access network, a 3GPP access network, a 3GPP2 access network, an 802.11 access network and an 802.16 access network. Each access network is connected to the MIHF layer 202 through an SAP to perform information interaction. As an upper layer, namely, layer 3 or a higher layer in the network, the MIH user layer 203 includes an application layer, a transport layer and a network layer, and is connected to the MIHF layer 202 through an MIH_SAP to perform information interaction. The MIHF layer 202 is connected to the network management entity 204 through an MIH_NMS_SAP (MIH network management system service access point) to perform information interaction. Each SAP includes a group of primitives, which are used for information processing in a specified information exchange format, and helpful for collecting the link layer information and controlling link behaviors in the handover.

FIG. 3 shows the location of an MIHF and key services in a network. As shown in FIG. 3, the MIHF is located between an MIH user layer (layer 3 or a higher layer, for example, Session Initiation Protocol (SIP), MIPV4, MIPV6, and HIP) and a lower layer (layer 2 or a lower layer, for example, 802.3, 802.11, 802.16, 3GPP and 3GPP2). The link layer event sent by the lower layer is transmitted to the MIH user layer after being converted by the MIHF layer into an MIH event. The MIH command issued by the MIH user layer is transmitted to the lower layer after being converted by the MIHF layer into a link layer command. For example, the L3MP manages, decides and controls the status of the lower-layer interface by using the events, commands and information services provided by the MIH protocol.

FIG. 4 shows the hierarchy of the MIH reference model. As shown in FIG. 4, the hierarchy of the MIH reference model includes a user hierarchy and a network hierarchy. The user communicates with the network through an MIH protocol. Moreover, an MIH-enabled mobile terminal receives the asynchronous operation commands such as event service from the lower layer.

Based on the foregoing heterogeneous network, the user can be handed over in the network. The handover methods adopted by the IEEE 802.21 protocol include hard handover and soft handover. The main factors that affect handover include: service continuity, application type, QoS, network discovery, network selection, security, power management, handover performed with the movement of the terminal, and handover policies.

In view of the power management in the foregoing factors, IEEE 802.21 proposes to use different power configuration modes in different working conditions.

In the current heterogeneous networks based on the IEEE 802.21 protocol, however, no handover policy is available for the terminal to select a lower-layer network connection automatically according to the current power status, and the power consumption of different networks is not taken as a decisive factor. Therefore, the terminal is unable to learn the power consumption parameters of various networks and unable to select a lower-layer network connection automatically according to the power consumption and the current power status. For example, if the battery power is low when a multi-mode terminal is setting up a network connection through an 802.11-based WiFi interface, the terminal is unable to notify the system to shut down the WiFi interface or automatically select a less power-consuming interface (for example, GSM/GPRS) for connecting so as to prolong the service time.

SUMMARY

Therefore, a main objective of various embodiments of the disclosure is to provide a method for power management in handover between heterogeneous networks, allowing a mobile terminal to select a lower-layer network connection automatically according to the current power status, thus implementing handover.

Another main objective of various embodiments of the disclosure is to provide an apparatus for power management in handover between heterogeneous networks, allowing a mobile terminal to select a lower-layer network connection automatically according to the current power status, thus implementing handover.

A third main objective of various embodiments of the disclosure is to provide a method for power management in handover between heterogeneous networks, allowing a mobile terminal to obtain the power consumption parameters at the network and select a lower-layer network connection automatically according to the power consumption and the current power status, thus implementing handover.

A fourth main objective of various embodiments of the disclosure is to provide an apparatus for power management in handover between heterogeneous networks, allowing a mobile terminal to obtain the power consumption parameters at the network and select a lower-layer network connection automatically according to the power consumption and the current power status, thus implementing handover.

In view of an objective mentioned above, various embodiments of the disclosure provide a method for power management in handover between heterogeneous networks, including:

determining, by an MIH user layer, a current handover policy according to power information, the power information being obtained by an MIH layer.

In view of another objective mentioned above, various embodiments of the disclosure provide an apparatus for power management in handover between heterogeneous networks, including an MIHF unit, adapted to obtain power information from outside; and an MIH user layer unit, adapted to obtain the power information and determine a handover policy according to the power information from the MIHF unit.

In view of another objective mentioned above, various embodiments of the disclosure provide a method for power management in handover between heterogeneous networks, including: obtaining, by an MIH layer, power information and providing the power information for the MIH user layer as requested by the MIH user layer.

In view of another objective mentioned above, various embodiments of the disclosure provide an apparatus for power management in handover between heterogeneous networks, including: an MIH user layer unit, adapted to request power information from an MIHF unit; and receive the power information from the MIHF unit, the power information being obtained from outside and sent to the MIH user layer unit by the MIHF unit.

The foregoing technical scheme shows that various embodiments of the disclosure allow the MIH user layer to determine a handover policy according to the power information from the MIH layer. In various embodiments of the disclosure, the MIH layer triggers an event so that the MIH user layer can obtain power information, and select a lower-layer network connection automatically according to the current power status, thus implementing handover; the MIH user layer sends a query request to the MIH layer to obtain power consumption parameters from the network, and selects a lower-layer network connection according to the power consumption and the current power status, thus implementing handover and making more accurate and effective decisions in the handover.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

The present disclosure is hereafter described in detail by reference to some exemplary embodiments and the accompanying drawings. First of all, the meanings of the terms, expressions and claims herein shall not be limited to the literal and ordinary meanings, but include the meanings and concepts compliant with the technologies under various embodiments of the disclosure. That is because the inventor needs to give definitions of the terms properly to describe various embodiments of the disclosure pertinently. Therefore, some exemplary embodiments other than all technical features of various embodiments of the disclosure are given in this part and the accompany drawings. Other various equivalent schemes or revised schemes may be substitutes of the scheme of various embodiments of the disclosure.

The MIH user layer is a user layer on layer 3 or a higher layer, and the network entity corresponding to the MIH layer is an MIHF.

Because the MIHF provides synchronous or asynchronous services for its upper layer and lower layer through a interface, various embodiments of the disclosure obtain power information of a lower-layer device through the MIHF, and provide the power information for the MIH user layer, and the MIH user layer originates user handover between heterogeneous networks.

The MIH user layer may obtain the power information in three ways: the MIHF triggers a power event, and reports power information to the MIH user layer; the MIHF reports the power information received from the link layer to the MIH user layer; and the MIH user layer queries the power information from the MIHF.

The method for power management in handover between heterogeneous networks under embodiments of the disclosure is hereinafter described through the following various embodiments.

Embodiment 1

In this embodiment, the MIH user layer obtains power information in this way: After triggering a power event, the MIHF reports power information to the MIH user layer.

Figure 1:
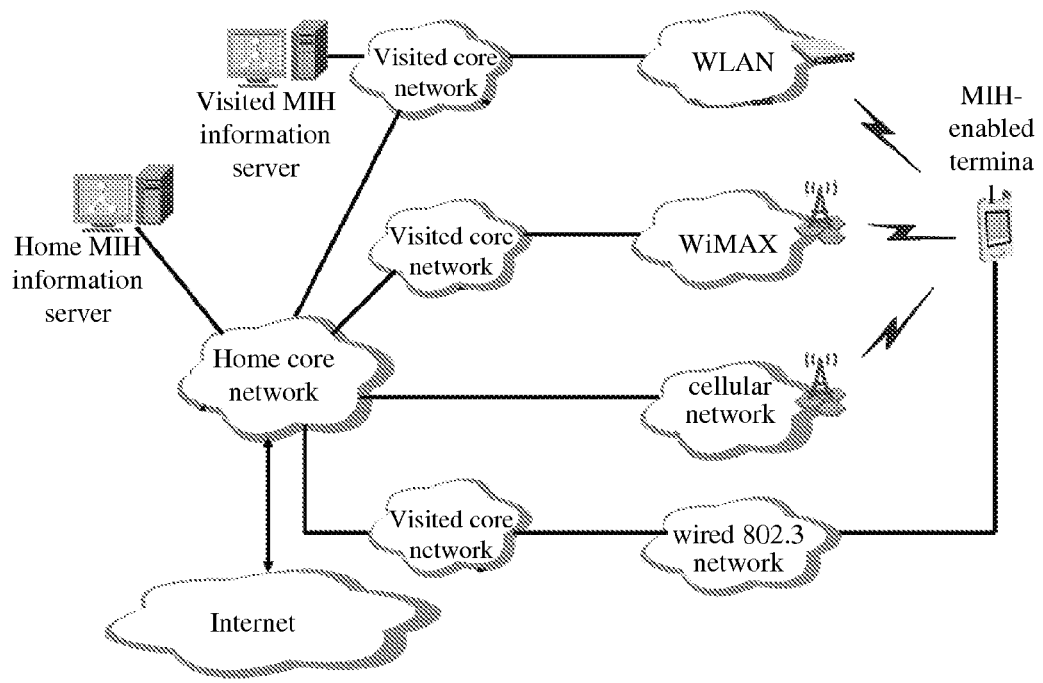
FIG. 1 shows an architecture of a heterogeneous network based on the IEEE 802.21 protocol.
Figure 2:
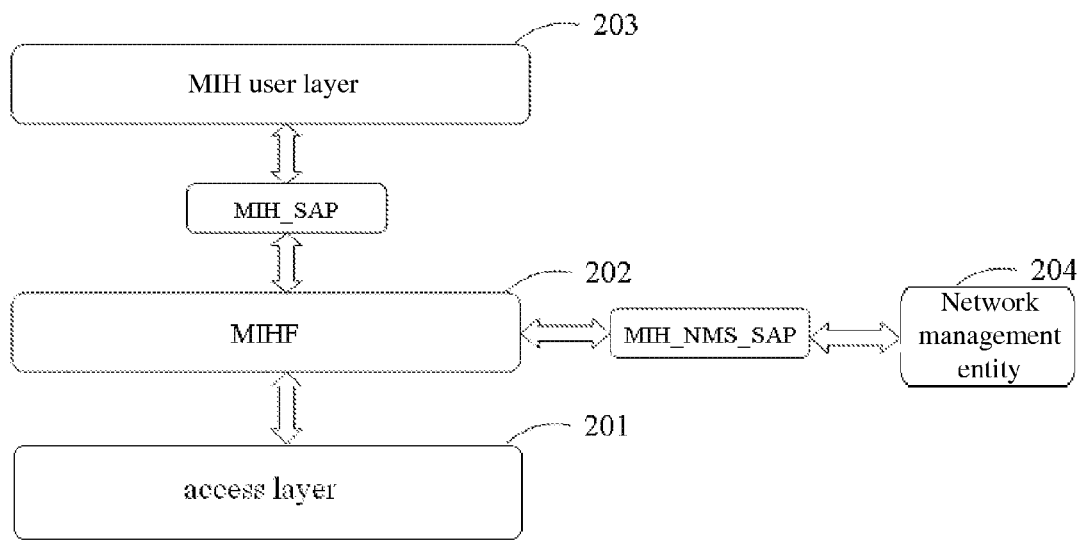
FIG. 2 shows a hierarchy of a heterogeneous network in the prior art.
Figure 3:
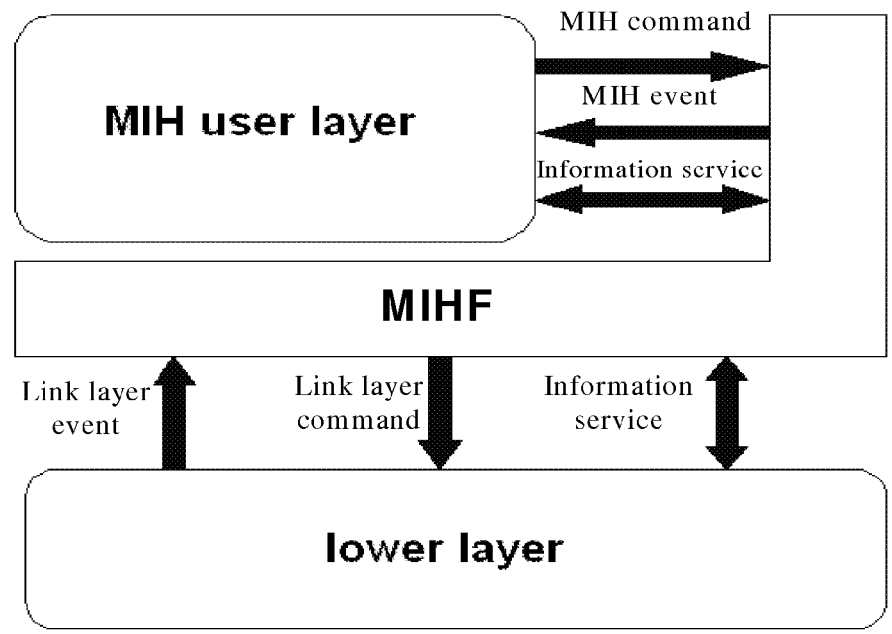
FIG. 3 shows a location of an MIHF and key services in a network.
Figure 4:
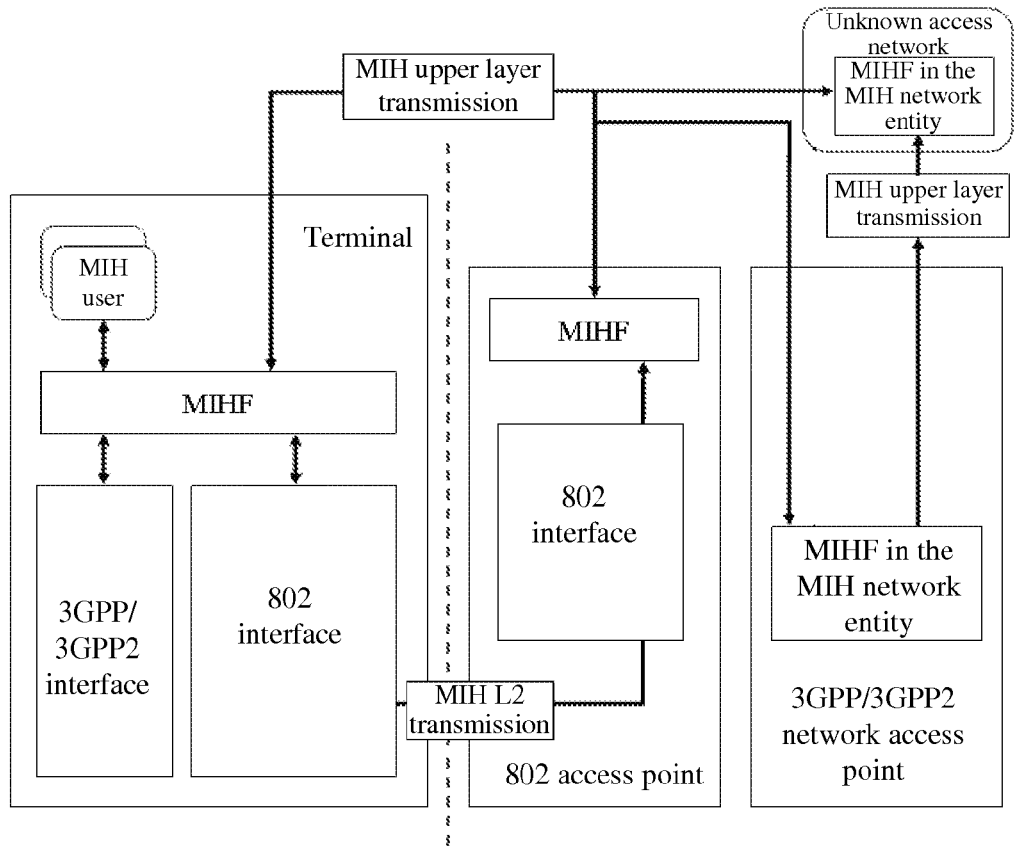
FIG. 4 shows a hierarchy of an MIH reference model.
Figure 5:
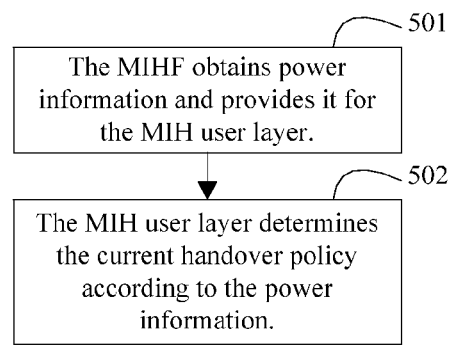
FIG. 5 is an exemplary flowchart of the method for power management in various embodiments of the disclosure.

FIG. 5 is an exemplary flowchart of the method for power management in this embodiment of the disclosure. As shown in FIG. 5, the method includes:

Block 501: The MIHF obtains power information and provides it for the MIH user layer.

Block 502: The MIH user layer determines the current handover policy according to the power information.

The power information is power status information; before block 501, the MIH user layer registers a power event with the MIHF; in block 501, the MIHF triggers a power event according to the obtained power information, and sends the power information to the MIH user layer; after block 502, the MIH user layer may determine whether handover is required according to the power status.

The MIHF may obtain power information from the outside in this way: The power information is obtained from a network management entity, or the lower device layer reports the Link_Going_Down event primitives. The MIHF may provide the power information for the MIH user layer by triggering a power event and reporting the power information to the MIH user layer through the event.

This embodiment of the disclosure also provides an apparatus for power management, which can implement the foregoing method.

Figure 6:
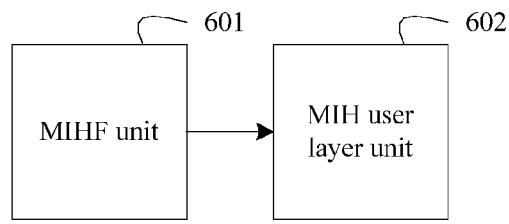
FIG. 6 is an exemplary architecture of the apparatus for power management in various embodiments of the disclosure.

FIG. 6 is an exemplary architecture of the apparatus for power management in this embodiment of the disclosure. As shown in FIG. 6, the apparatus includes an MIHF unit 501 and an MIH user layer unit 602.

The MIHF unit 601 is adapted to obtain power information from outside, and send the power information to the MIH user layer unit 602.

The MIH user layer unit 602 is adapted to determine the current handover policy according to the power information from the MIHF unit 601.

The MIH user layer unit 602 also implements the relevant functions of layer 3 and higher layers in the network.

The following elaborates on the methods for power management in this embodiment of the disclosure. This embodiment provides two methods for power management: the MIHF triggers a power event according to the power status information provided by the network management entity, and reports the power status information to the MIH user layer; the MIHF obtains the power status information of the lower-layer device through the link-going-down event reported by the link layer, and reports the power status information to the MIH user layer by triggering a link-going-down event to the MIH user layer.

First, method 1 for power management is described below. In method 1, to obtain the power status of a link in a heterogeneous network, the MIH user layer registers a power event containing a threshold value with the MIHF; the MIHF obtains the relevant power status information according to the registered power event, and triggers the event when the power drops below the threshold.

Figure 7:
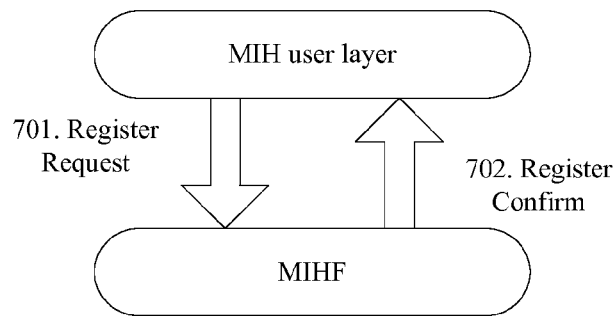
FIG. 7 is a flowchart of registering a power event in method 1 for power management in various embodiments of the disclosure.

FIG. 7 is a flowchart of registering a power event in method 1 for power management in this embodiment of the disclosure. As shown in FIG. 7, the registration process includes the following steps:

Step 701: The MIH user layer sends an MIH_Event_Register_Request (EventSource, MIH_Power_State, Threshold) message to the MIHF as a Register request, requesting to register a power event "MIH_Power_State", and triggers the event to the MIH user layer when the power of the device drops below the threshold.

The MIH_Power_State event means that the power of the device is lower than a threshold, and the power of the device will fail in the specified time; the Register request also carries multiple parameters for notifying the power status information of the lower layer device to the MIH user layer, as shown in Table 1.

TABLE 1

| Parameter | Type | Description |
| --- | --- | --- |
| EventSource | MIH_EVENT_SOURCE | Source that triggers the event |
| MacMobileTerminal | MAC address | MAC address of the mobile device |
| TimeInterval | Millisecond | Predicted time interval of power failure of the device |
| ConfidenceState | Percentage (0-100) | Predicted probability of power failure of the device in the specified time interval |
| UniqueEventIdentifer | 0-65535 | Unique identifier of the event in the case of rollback |

In Table 1, ConfidenceState indicates the accuracy of the predicted power failure time. When the value of ConfidenceState is 100%, the power of the device will surely fail in the specified time interval. For example, the BS decides to shut power of the device in the specified time for the purpose of device management. Different applications impose different requirements on the time interval from triggering an MIH_Power_State event to complete power failure. Therefore, to ensure sufficient time for completing the handover, a proper threshold value must be selected in the registration of the MIH_Power_State event. After the MIH_Power_State event is triggered, the parameters of the message that notifies the MIH user layer carry the predicted time interval from triggering the MIH_Power_State event to complete power failure. Therefore, the parameters of the message that notifies the MIH user layer also include a prediction reliability field, from which the MIH user layer knows the accuracy of the predicted time.

Step 702: After receiving the Register request of the MIH user layer, the MIHF returns a Register Confirm message to the MIH user layer as a response to the Register request.

Through the foregoing registration process, the MIH user layer may obtain the power status of the link corresponding to the event after the MIHF triggers the registered power event.

Instead of carrying a power threshold value in the Register request, the MIH user layer may send a parameter configuration primitive containing the power threshold value to the MIHF before or after sending the Register request, or send the power threshold value to the network management entity directly through an OS interface.

Figure 8:
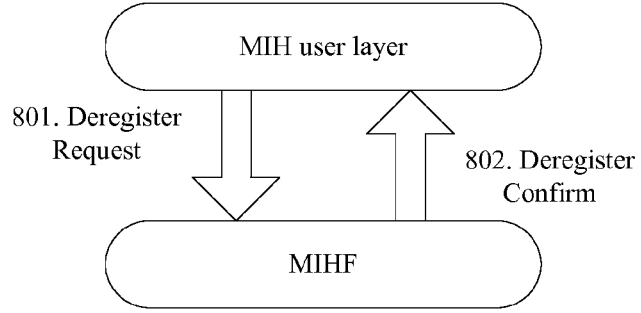
FIG. 8 is a flowchart of deregistering a power event in method 1 for power management in various embodiments of the disclosure.

The power event may be deregistered when the MIH user layer does not need to know the power status of the link corresponding to the power event any longer. FIG. 8 is a flowchart of deregistering a power event in method 1 for power management in this embodiment of the disclosure. As shown in FIG. 8, the deregistration process includes the following steps:

Step 801: The MIH user layer sends a Deregister request to the MIHF.

Step 802: According to the Deregister request, the MIHF deregisters the corresponding power event, and returns a Deregister Confirm message.

Through the foregoing registration process and deregistration process, the MIH user layer may select a lower-layer device in a heterogeneous network randomly and obtain the power status information of the link.

Figure 9:
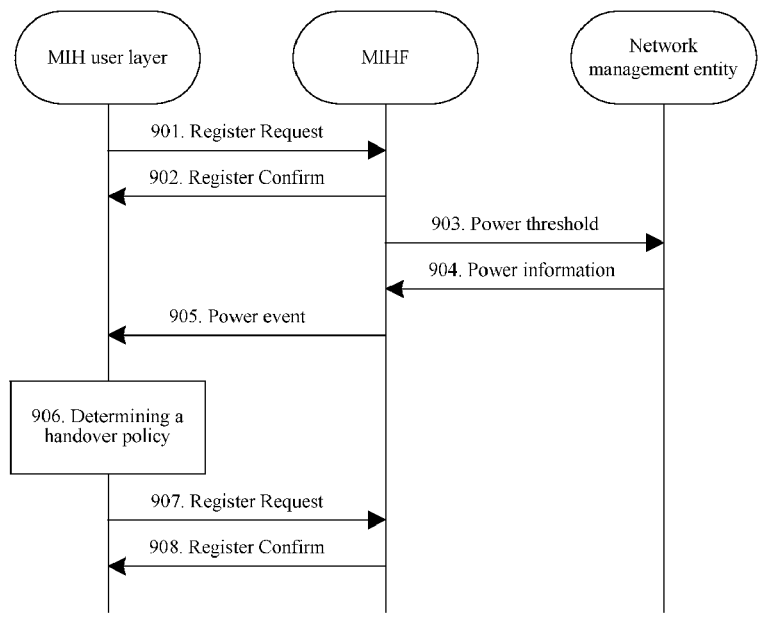
FIG. 9 is a flowchart of method 1 for power management in various embodiments of the disclosure.

FIG. 9 is a flowchart of method 1 for power management in this embodiment of the disclosure.

Step 901: When the MIH user layer is concerned about the power event of a lower-layer link, the MIH sends an MIH_Event_Register_Request message to the MIHF, requesting to register a power event that contains a power threshold of the device. The MIH user layer includes an application layer, a transport layer and a network layer. Instead of carrying a power threshold value in the Register request, the MIH user layer may send a parameter configuration primitive containing the power threshold value to the MIHF before or after sending the Register request, or send the power threshold value to the network management entity directly through an OS interface.

Step 902: The MIHF sends an MIH_Event_Register_Confirm message to the MIH user layer, whereupon the power event is registered successfully, and responds to the Register request.

The foregoing step 901 and step 902 are the same as the registration process shown in FIG. 7.

Step 903: The MIHF stores the power threshold of the device in the management information base (MIB) of the network management entity.

In this step, the MIHF stores the threshold value carried in the MIH_Power_State event at the time of registration into the MIB, and the network management entity can know the power of the lower-layer device through an OS interface.

Step 904: When the power of the lower-layer device drops below the power threshold of the device, the network management entity sends power status information to the MIHF layer automatically, indicating that the power of the lower-layer device is lower than the threshold; or the MIHF queries the current power information of the lower-layer device in the network management entity periodically through polling. The network management entity obtains the power information of the lower-layer device through an OS interface.

Step 905: The MIHF triggers the power event to the MIH user layer when the power of the lower-layer device drops below the power threshold of the device. The power event triggered by the MIHF to the MIH user layer carries the parameters for notifying the power status information of the lower layer device to the MIH user layer, and the MIH user layer obtains the current power status of the lower-layer device according to the lower-layer device information. The lower-layer device information includes: source that triggers the event, MAC address of the mobile device, predicted time interval from triggering a power event to complete power failure of the device, predicted probability of power failure of the device in the specified time interval; current power, and information about the network interfaces incompliant with the current power requirement.

Step 906: The MIH user layer determines the network status according to the information carried in the power event, and may choose whether to perform network handover according to the current network status. If no network handover is required, the power threshold of the device in the power event may be reconfigured. If network handover is required, the MIH user layer sends a query request to the MIHF; the MIHF obtains the handover decision information from an information server (IS), and sends the handover decision information to the MIH user layer; the MIH user layer determines a network handover policy according to the handover decision information, specifying a target network for handover. For example, the MIH user layer scans the currently available networks, selects a target network for handover, pre-allocates resources between the current network and the target network, and finally performs network handover by issuing a fast handover command.

In this step, the MIH user layer starts the handover process when the ConfidenceState falls on a specific level. For example, after the MIH user layer receives MIH_Power_State, it may start scanning the currently available networks, select a target network for handover, pre-allocate resources between the mobile terminal and the target network, and finally issue a fast handover command.

Step 907 to step 908: When the MIH user layer finishes the lower-layer handover and is in the normal working status or is not concerned about the power event of a link, it originates a deregistration process to the MIH through the relevant primitives, as shown in FIG. 8.

The MIH user layer may also register multiple power events concurrently, namely, implement multiple processes mentioned above concurrently, thus obtaining the power status information of multiple lower-layer devices in a heterogeneous network and performing power management.

This embodiment of the disclosure also provides an apparatus for power management in handover between heterogeneous networks, which can implement the foregoing method.

Figure 10:
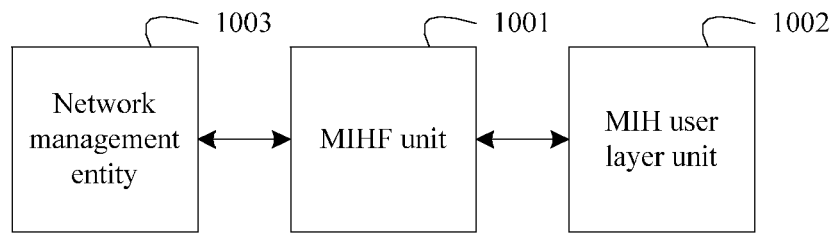
FIG. 10 shows an architecture of apparatus 1 for power management in various embodiments of the disclosure.

FIG. 10 shows an architecture of apparatus 1 for power management in this embodiment of the disclosure. As shown in FIG. 10, the apparatus for power management under this embodiment includes an MIHF unit 1001, an MIH user layer unit 1002 and a network management entity 1003.

The MIHF unit 1001 is adapted to register a power event according to the Register request from the MIH user layer unit 1002, send a Register Confirm message to the MIH user layer unit 1002, and respond to the Register request; send the threshold value in the Register request to the network management entity; query or receive the power status notification and/or power status information from the network management entity 1003, trigger a power event according to the power status notification, and send to the MIH user layer unit 1002 the parameters for notifying the power status information of the lower layer device to the MIH user layer; deregister the power event corresponding to the Deregister request from the MIH user layer unit 1002, send a Deregister Confirm message to the MIH user layer unit 1002, and respond to the Deregister request.

The MIH user layer unit 1002 is adapted to send a Register request and a Deregister request to the MIHF unit 1001, and receive the Deregister Confirm message and the Deregister Confirm message from the MIHF unit 1001; receive from the MIHF unit 1001 the parameters for notifying the power status information of the lower layer device to the MIH user layer, confirm the power status of the lower-layer device according to the power status information in the parameters, and determine a handover policy.

The network management entity 1003 is adapted to receive the threshold value from the MIHF unit 1002, and provide the power status and/or power status notification for the MIHF unit 1002 when the power of the lower-layer device drops below the threshold;

The foregoing apparatus may include other functional units; the MIH user layer unit 1002 may also implement relevant functions of layer 3 and higher layers in the network, and originate handover when necessary.

Method 1 and apparatus 1 for power management in this embodiment of the disclosure have been described above. Method 2 for power management in this embodiment of the disclosure is described below.

In method 2, the MIHF obtains the power status information of the lower-layer device through the link-going-down event reported by the link layer, and reports the power status information to the MIH user layer by triggering the link-going-down event to the MIH user layer.

In this method, supposing the link-going-down events are Link_Going_Down and MIH_Link_Going_Down, the MIH use layer needs to register an MIH_Link_Going_Down event with the MIHF, and then the MIHF registers a Link_Going_Down event with the lower link layer; when the remaining power of the system is not enough for keeping the current link, the lower link layer sends a Link_Going_Down event containing power information to the MIHF so that the MIHF obtains the relevant power information according to the registered event. The MIHF may obtain power information in other ways. For example, the MIH user layer puts the power threshold value into the request when requesting to register an MIH_Link_Going_Down event with the MIHF, and the MIHF sends the threshold value to the network management entity; or the MIH user layer sends the power threshold value to the network management entity directly through the parameter configuration primitives, and then obtains the power information from the network management entity in a way similar to the process of obtaining power information in method 1.

Link_Going_Down and MIH_Link_Going_Down are event primitives sent from the link layer to the MIHF, from the MIHF to the MIH user layer respectively. ReasonCode in the primitive indicates the reason why a link break event is imminent. Link_Going_Down and MIH_Link_Going_Down contain ReasonCode and other parameters, as shown in Table 2.

TABLE 2

| Parameter | Type | Default Value |
|---|---|---|
| MacMobileNode | MAC address | |
| MacNewPoA | MAC address (optional) | |
| TimeInterval | Integer | 0-65535 |
| ConfidenceLevel | Percentage | 0-100 |
| ReasonCode | Enumeration | 0-255 |
| UniqueEventIdentifer | Integer | 0-65535 |

ReasonCode in Table 2 includes the following enumerated variable values:
 0: RC_EXPLICIT_DISCONNECT
 1: RC_LINK_PARAM_DEGRADING
 2: RC_LOW_POWER
 3: RC_NORESOURCE
 4: 127: Reserved
 128-255: RC_VENDOR_SPECIFIC When the variable value is 2, the value of ReasonCode is RC_LOW_POWER, indicating that the remaining power is not enough for keeping the current link.

Figure 11:
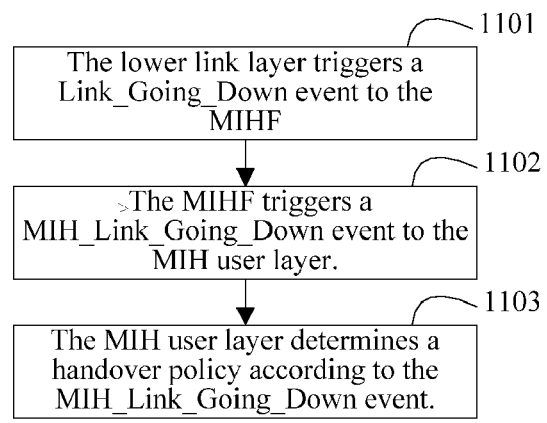
FIG. 11 is a flowchart of method 2 for power management in various embodiments of the disclosure.

FIG. 11 is a flowchart of method 2 for power management in this embodiment of the disclosure. As shown in FIG. 11, supposing the link-going-down event reported by the link layer is Link_Going_Down and the link-going-down event reported by the MIHF is MIH_Link_Going_Down, after the MIH user layer registers an MIH_Link_Going_Down event with the MIHF and the MIHF registers a Link_Going_Down event with the lower link layer, the method 2 for power management includes:

Block 1101: When the lower link layer detects that the remaining power is not enough for keeping the current link, it triggers the Link_Going_Down event to the MIHF, and sends the event primitive Link_Going_Down to the MIHF, indicating that the current link will be broken.

In this block, the value of ReasonCode in the Link_Going_Down is RC_LOW_POWER, and the Link_Going_Down event also includes other parameters indicative of power information; the MIHF may obtain the power information in this way: The MIHF stores the power threshold value provided by the MIH user layer into the network management entity, or the MIH user layer stores the power threshold value into the network management entity directly through an OS interface; then the MIHF queries the power information in the network management entity periodically, or the network management entity sends the power information to the MIHF according to the power threshold value.

Block 1102: After receiving the Link_Going_Down event and identifying that the value of ReasonCode is RC_LOW_POWER, the MIHF triggers the MIH_Link_Going_Down event to the MIH user layer, and sends the event primitive MIH_Link_Going_Down to the MIH user layer.

In this block, the value of ReasonCode in the MIH_Link_Going_Down event is RC_LOW_POWER too, and the MIH_Link_Going_Down event also includes other parameters indicative of power information; if the MIHF obtains power information from the network management entity, the MIHF triggers the MIH_Link_Going_Down event to the MIH user layer when the remaining power indicated in the power information is not enough for keeping the lower-layer link.

Block 1103: The MIH user layer determines a handover policy according to the MIH_Link_Going_Down event. In this block, the MIH user layer determines a handover policy according to the value of ReasonCode in the MIH_Link_Going_Down event.

The process of registering the MIH_Link_Going_Down event prior to the foregoing process is the same as the registration process in method 1 of this embodiment of the disclosure, and the Register request may carry a power threshold value; the MIH user layer may carry a power threshold value in the Register request, and send the power threshold value to the MIHF, or, before or after sending the Register request, the MIH user layer may send the parameter configuration primitives containing the power threshold value to the MIHF or to the network management entity directly through an OS interface; the process of registering the Link_Going_Down event with the link layer may also be the same as the registration process in method 1 of this embodiment of the disclosure.

After the foregoing process, the MIH user layer may deregister the MIH_Link_Going_Down event from the MIHF according to the deregistration process of method 1 shown in FIG. 8.

Method 2 of this embodiment of the disclosure may be used for power management of multiple lower-layer links, for example, a type of GSM/WiFi dual-mode terminal, which can access the network in the GSM or WiFi mode and has an MIH layer. Generally, the GSM mode is more energy-efficient than the WiFi mode. When the user uses a terminal in the WiFi mode but the battery power is low at a moment, the current WiFi working link sends a Link_Going_Down event to the MIH layer, carrying an RC_LOW_POWER reason code. The MIH user layer may hand over the current session to a more energy-efficient GSM link according to this event and the handover policy, thus prolonging the service duration of the terminal effectively.

This embodiment of the disclosure also provides an apparatus for power management in handover between heterogeneous networks, which can implement the foregoing method.

Figure 12:
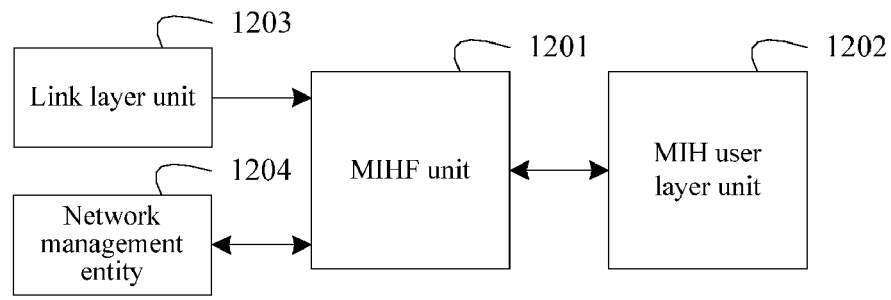
FIG. 12 shows an architecture of apparatus 2 for power management in various embodiments of the disclosure.

FIG. 12 shows an architecture of apparatus 2 for power management in this embodiment of the disclosure. As shown in FIG. 12, supposing the link-going-down event reported by the link layer is Link_Going_Down and the link-going-down event reported by the MIHF is MIH_Link_Going_Down, the apparatus for power management under the disclosure includes an MIHF unit 1201, an MIH user layer unit 1202 and a link layer unit 1203.

The MIHF unit 1201 is adapted to send the MIH_Link_Going_Down event to the MIH user layer unit 1002 according to the Link_Going_Down event from the link layer unit 1203.

The MIH user layer unit 1202 is adapted to confirm the power status of the lower-layer device according to the MIH_Link_Going_Down event from the MIHF unit 1201, and determine a handover policy.

The link layer unit 1203 is adapted to trigger the Link_Going_Down event to the MIHF when the lower link layer detects that the power is not enough for keeping the current link, and send the event primitive Link_Going_Down to the MIHF unit 1201.

In practice, the MIHF unit 1201 may be further adapted to register an MIH_Link_Going_Down event for the MIH user layer unit 1202 according to the Register request from the MIH user layer unit 1202, and send a Register Confirm message to the MIH user layer unit 1202; deregister the MIH_Link_Going_Down event corresponding to the Deregister request sent from the MIH user layer unit 1202, and send a Deregister Confirm message to the MIH user layer unit 1202; send a Register request to the link layer unit 1203 according to the Register request from MIH user layer unit 1202, requesting to register a Link_Going_Down event; and receive the Register Confirm message from the link layer unit 1203.

The MIH user layer unit 1202 is further adapted to send a Register request and a Deregister request to the MIHF unit 1201; and receive the Register Confirm message and the Deregister Confirm message from the MIHF unit 1201.

The link layer unit 1203 is further adapted to register a Link_Going_Down event for the MIHF unit 1201 according to the Register request from the MIHF unit 1201, and send a Register Confirm message to the MIHF unit 1201.

The apparatus for power management in this embodiment of the disclosure may further include a network management entity 1204, adapted to store the power threshold value from the MIHF unit 1202; and provide the power status and/or the power status notification for the MIHF unit 1202.

In this case, the MIHF unit 1202 may be further adapted to send the power threshold value in the Register request from the MIH user layer unit 1201 to the network management unit 1204; and trigger the MIH_Link_Going_Down event to the MIH user layer unit 1201 according to the power status and/or the power status notification from the network management entity 1204.

The foregoing apparatus may include other functional units; the MIH user layer unit 1002 may also implement relevant functions of layer 3 and higher layers in the network, and originate handover when necessary.

All the methods and apparatus for power management in this embodiment of the disclosure implement power management by triggering a power event, and the events used for power management may be other events.

Embodiment 2

In this embodiment of the disclosure, the MIH user layer obtains the power consumption parameters in this way: The MIH user layer queries the power consumption parameters from the MIHF.

Figure 13:
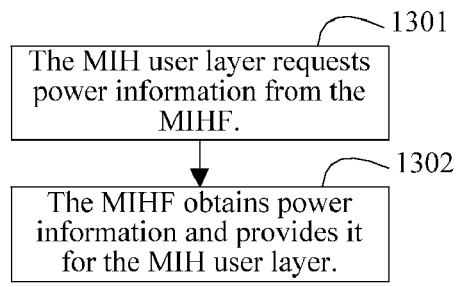
FIG. 13 is an exemplary flowchart of the method for power management in another various embodiment of the disclosure.

FIG. 13 is an exemplary flowchart of the method for power management in this embodiment of the disclosure. As shown in FIG. 13, the method includes the following steps:

Block 1301: The MIH user layer requests power information from the MIHF.

Block 1302: The MIHF obtains the power information and provides the power information for the MIH user layer.

In the foregoing process, after block 1302, the MIH user layer may determine the current handover policy according to the power information. The power information contains the power status information at the user and the power consumption parameters of the lower-layer link at the network.

Figure 14:
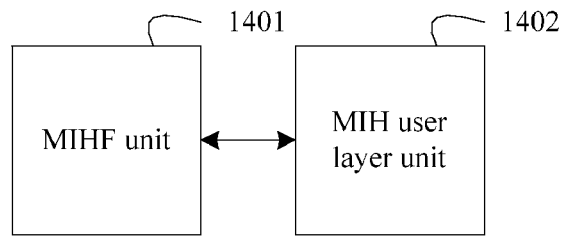
FIG. 14 is an exemplary architecture of the apparatus for power management in another various embodiment of the disclosure.

FIG. 14 is an exemplary architecture of the apparatus for power management in this embodiment of the disclosure. As shown in FIG. 14, the apparatus includes an MIHF unit 1401 and an MIH user layer unit 1402.

The MIHF unit 1401 is adapted to obtain power information from outside, and send it to the MIH user layer unit 1402.

The MIH user layer unit 1402 is adapted to obtain power information from the MIHF unit 1401, and receive the power information from the MIHF unit 1401.

The MIH user layer unit 1402 also implements the relevant functions of layer 3 and higher layers in the network.

The following elaborates on the methods for power management in this embodiment of the disclosure. This embodiment provides two methods for power management: the MIHF obtains power information based on the MAC layer; and the MIHF obtains power information based on the IP layer.

Figure 15:
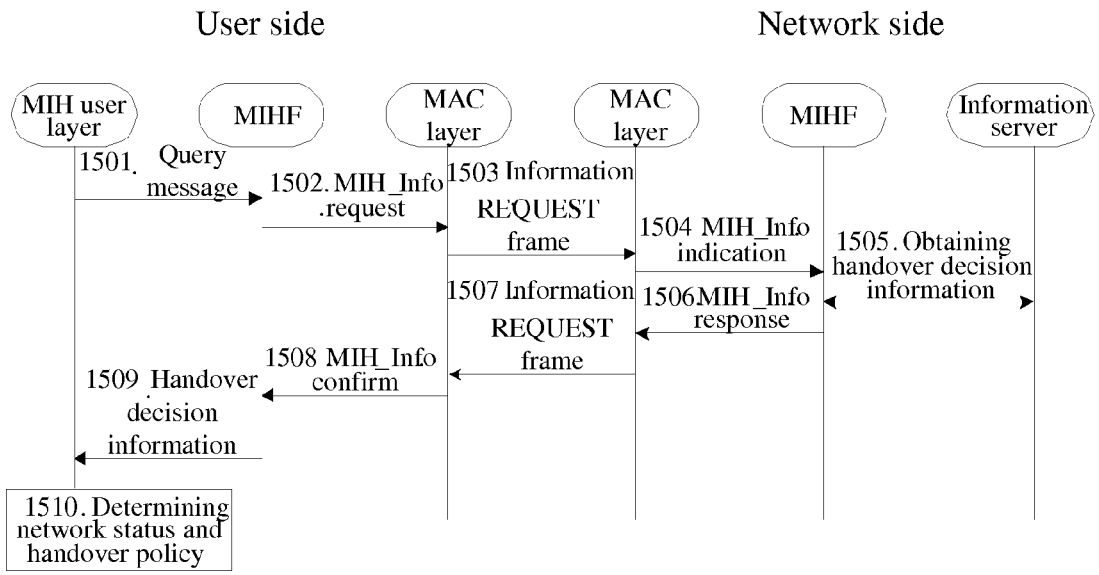
FIG. 15 is a flowchart of method 1 for power management in another various embodiment of the disclosure.

Method 1 for power management is described below. FIG. 15 is a flowchart of method 1 for power management in this embodiment of the disclosure. As shown in FIG. 15, the method includes the following steps:

Step 1501: The MIH user layer at the user sends a query message to the MIHF, requesting to obtain handover decision information.

Step 1502: The MIHF at the user sends an MIH_Info.request message to the MAC layer at the user, requesting to obtain handover decision information.

Step 1503: The MAC layer at the user sends an Information REQUEST frame to the MAC layer at the network, requesting to obtain handover decision information.

Step 1504: The MAC layer at the network sends an MIH_Info.indication message to the MIHF at the network, requesting to obtain handover decision information.

Step 1505: The MIHF at the network obtains relevant handover decision information from an IS. The handover decision information includes: power information, signal strength and tariff. Power information is a new type of handover decision information in various embodiments of the disclosure.

Step 1506: The MIHF at the network sends an MIH_Info.response message containing the handover decision information to the MAC layer at the network.

Step 1507: The MAC layer at the network puts the received handover decision information into an Information REQUEST frame, and sends the frame to the MAC layer at the user.

Step 1508: The MAC layer at the user puts the received handover decision information into an MIH_Info.confirm message, and sends the message to the MIHF at the user.

Step 1509: The MIHF at the user sends the received handover decision information containing the power information to the MIH user layer at the user.

In the foregoing process, because the MIHF itself does not store information, the relevant data information is stored on the IS.

Step 1510: The MIH user layer at the user determines the current network status and handover policy according to the handover decision information, and decides to perform network handover under certain conditions, for example, when network handover needs to be performed according to the power information, the MIH user layer determines a target network for handover according to the power information of different networks. When the MIH user layer decides to perform network handover, the MIH user layer scans the currently available networks, selects a target network for handover, pre-allocates resources between the current network and the target network, and performs network handover by issuing a fast handover command to the network.

In this step, when the Link_Going_Down event (triggered by deterioration of signals of the link layer) or MIH_Power_State event mentioned in the first embodiment occurs, if the MIH user layer decides to originate handover, it obtains the relevant handover decision information, for example, power information, signal strengthen, and tariff, and makes a correct handover decision according to such decision information. For example, after the user knows the power consumption information for access to different networks, a handover decision is made after all the factors such as signal strength are considered; if the user gives the top priority to the remaining power, the user may choose to access the least power-consuming network whose signal strength is not necessarily the best.

Method 1 of this embodiment of the disclosure has been described above. Method 2 of this embodiment is described below.

Figure 16:
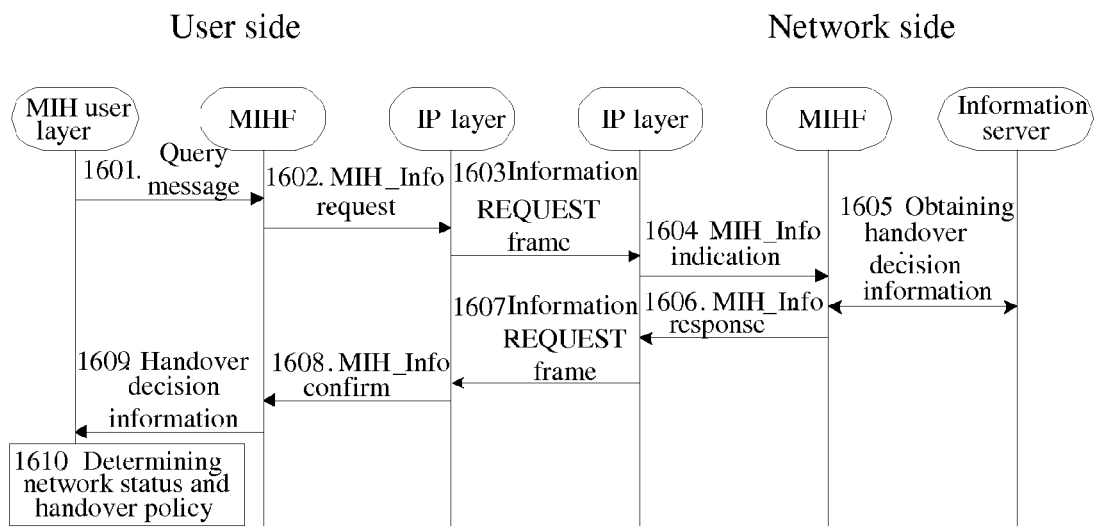
FIG. 16 is a flowchart of method 2 for power management in another various embodiment of the disclosure.

In method 2, the MIHF obtains power information based on the IP layer. FIG. 16 is a flowchart of method 2 for power management in this embodiment of the disclosure. As shown in FIG. 16, the method includes the following steps:

Step 1601: The MIH user layer at the user sends a query message to the MIHF, requesting to obtain power information.

Step 1602: The MIHF at the user sends an MIH_Info.request message to the IP layer at the user, requesting to obtain power information.

Step 1603: The IP layer at the user sends an Information REQUEST frame to the IP layer at the network, requesting to obtain power information.

Step 1604: The IP layer at the network sends an MIH_Info.indication message to the MIHF at the network, requesting to obtain handover decision information.

Step 1605: The MIHF at the network obtains the relevant handover decision information from the IS. The handover decision information includes: power information, signal strength and tariff. Power information is a new type of handover decision information in this embodiment of the disclosure.

Step 1606: The MIHF at the network sends an MIH_Info.response message containing the power information to the IP layer at the network.

Step 1607: The IP layer at the network puts the received power information into an Information REQUEST frame, and sends the frame to the IP layer at the user.

Step 1608: The MAC layer at the user puts the received power information into an MIH_Info.confirm message, and sends the message to the MIHF at the user.

Step 1609: The MIHF at the user sends the received power information to the MIH user layer at the user.

In the foregoing process, because the MIHF itself does not store information, the relevant data information is stored on the IS.

Step 1610: The MIH user layer at the user determines the current network status according to the handover decision information, and decides to perform network handover under certain conditions.

The basic process of method 2 is the same as the operation process of method 1.

Figure 17:
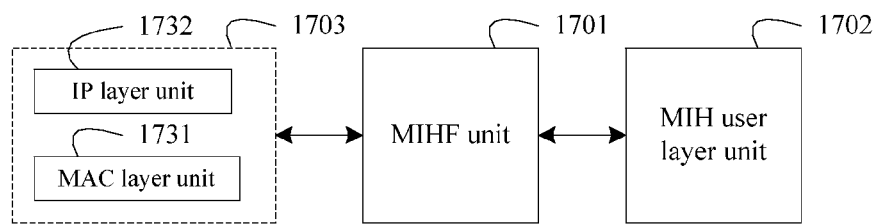
FIG. 17 shows an architecture of the apparatus for power management in another various embodiment of the disclosure.

Two methods for power management in this embodiment of the disclosure have been described above. This embodiment also provides an apparatus for power management in handover between heterogeneous networks, which can implement the foregoing two methods. FIG. 17 shows an architecture of the apparatus for power management in the this of the disclosure. As shown in FIG. 17, the apparatus includes an MIHF unit 1701, an MIH user layer unit 1702 and a network layer unit 1703.

The MIHF unit 1701 is adapted to request power information from the network layer unit 1703; and send the power information received from the network layer unit 1703 to the MIH user layer unit 1702.

The MIH user layer unit 1702 is adapted to obtain power information from the MIHF unit 1701; and receive the power information from the MIHF unit 1701.

The network layer unit 1703 is adapted to obtain power information from an external network as requested by the MIHF unit 1701, and send it to the MIHF unit 1701.

The MIH user layer unit 1702 also implements the relevant functions of layer 3 and higher layers in the network.

In practice, the network layer unit 1703 may include: a MAC layer unit 1731 and an IP layer unit 1732, respectively adapted to obtain power information from the MAC layer and the IP layer of an external network, and send the information to the MIHF unit 1701; the MIH user layer unit 1702 may also include an IP layer unit, adapted to obtain power information from the IP layer of an external network, and send the information to the MIHF unit 1701.

In this embodiment of the disclosure, the MIHF at the user may also obtain power information from other networks.

The methods for power management in this embodiment may also be implemented in the process of determining a handover policy in the methods of the first embodiment.

Although the disclosure has been described through exemplary various embodiments, the disclosure is not limited to such various embodiments. It is apparent that those skilled in the art can make various modifications and variations to the disclosure without departing from the spirit and scope of the disclosure. The disclosure is intended to cover the modifications and variations provided that they fall in the scope of protection defined by the claims or their equivalents.

What is claimed is:

1. A method for power management in handover between heterogeneous networks, comprising:
   determining, by an media independent handover (MIH) user layer, a handover policy according to power information;
   wherein the power information is obtained by an MIH layer; and
   registering, by the MIH user layer, with the MIH layer a power event carrying a power threshold of a device;
   wherein the information carried in the power event comprises: source that triggers the event, media access control (MAC) address of the mobile device, predicted time interval from triggering a power event to complete power failure of the device, predicted probability of power failure of the device in the specified time interval; current power, and information about the network interfaces incompliant with the current power requirement.

2. The method of claim 1, wherein the process of registering a power event comprises:
   by the MIH user layer, sending a Register request to the MIH layer and requesting to register a power event; and
   by the MIH layer, registering a power event for the MIH user layer as requested, and obtaining a power threshold value from the MIH user layer, wherein the power event is triggered when the power of the device drops below the threshold.

3. The method of claim 2, wherein obtaining a power threshold value from the MIH user layer comprises:
   sending, by the MIH user layer, a Register request containing a power threshold value to the MIH layer; or
   sending, by the MIH user layer, a parameter configuration primitive containing a power threshold value to the network management entity.

4. The method of claim 2, wherein the process of obtaining the power information of the device comprises:
   storing, by the MIH layer, the power threshold of the device into a network management entity; and
   by the network management entity, sending power status information to the MIH layer automatically, indicating that the power of the lower-layer device is lower than the threshold when the power of the lower-layer device drops below the power threshold of the device; or by the MIH layer, querying the current power information of the lower-layer device in the network management entity periodically through polling.

5. The method of claim 4, wherein storing the power threshold of the lower-layer device into a network management entity by the MIH layer comprises:
storing the threshold value carried in the power event Register request into a management information base (MIB) of the network management entity, by the MIH layer; and
learning, by the network management entity, the power information of the lower-layer device through an operating system (OS) interface.

6. The method of claim 4, further comprising:
by the MIH layer, triggering the power event to the MIH user layer, and sending the power event that carries the power information to the MIH user layer, when the power of the lower-layer device drops below the power threshold of the device.

7. The method of claim 6, further comprising: determining the handover policy according to the received event, and, if handover is required, deciding to perform network handover according to the information carried in the power event, by the MIH user layer.

8. The method of claim 1, further comprising:
by the MIH user layer, sending a Register request to the MIH layer, requesting to register a link-going-down event; and
registering, by the MIH layer, a link-going-down event for the MIH user layer as requested.

9. The method of claim 8, further comprising: registering, by the MIH layer, a link-going-down event with a link layer; and
wherein obtaining the power information of the device comprising: reporting, by the link layer, a power status information to the MIH layer through a link-going-down event carrying the power information.

10. The method of claim 9, wherein the link-going-down event registered by the MIH layer with the link layer carrying the parameters indicative of the event reason comprises the parameter of low power.

11. The method of claim 10, wherein the link-going-down event registered by the MIH layer with the link layer is Link_Going_Down;
the parameter that indicates the event reason is ReasonCode; and
the parameter indicative of low power contained in ReasonCode is RC_LOW_POWER.

12. The method of claim 8, further comprising: obtaining a power threshold value from the MIH user layer, and triggering a power event when the power of the device drops below the threshold;
wherein obtaining the power information of the device comprises:
storing, by the MIH layer, the power threshold of the device into a network management entity; and
by the network management entity, sending power status information to the MIH layer automatically, indicating that the power of the lower-layer device is lower than the threshold, when the power of the lower-layer device drops below the power threshold of the device; or
by the MIH layer, querying the power information of the lower-layer device in the network management entity periodically through polling, when the power of the lower-layer device drops below the power threshold of the device.

13. The method of claim 12, wherein obtaining a power threshold value from the MIH user layer comprises:
sending, by the MIH user layer, a Register request containing a power threshold value to the MIH layer; or sending, by the MIH user layer, a parameter configuration primitive containing a power threshold value to the network management entity.

14. The method of claim 8, further comprising: sending, by the MIH layer, the link-going-down event containing the power information to the MIH user layer according to the obtained power information.

15. The method of claim 14, further comprising: by the MIH user layer, determining the handover policy according to the received event, and, if handover is required, deciding to perform network handover according to the information carried in the power event.

16. The method of claim 8, wherein the link-going-down event registered by the MIH user layer with the MIH layer carrying the parameters indicative of the event reason includes the parameter of low power.

17. The method of claim 16, wherein the link-going-down event registered by the MIH user layer with the MIH layer is MIH_Link_Going_Down;
the parameter that indicates the event reason is ReasonCode; and
the parameter indicative of low power contained in ReasonCode is $RC_{13}\ LOW_{13}\ POWER$.

18. The method of claim 1, further comprising:
sending, by the MIH user layer, a query request to the MIH layer;and
determining, by the MIH user layer, a network handover policy according to the handover decision information;
wherein the handover decision information containing the power information to the MIH user layer by the MIH layer.

19. The method of claim 1, wherein the MIH user layer comprises: an application layer, a transport layer or a network layer.

20. The method of claim 1, further comprising:
by the MIH user layer, originating a power event Deregister request to the lower-layer device through the MIH layer; and
by the MIH layer, returning deregistration response information, and feeding back a deregister confirm command to the MIH user layer.

21. An apparatus for power management in handover between heterogeneous networks, comprising:
a media independent handover function (MIHF) unit, adapted to obtain power information from outside; and
a media independent handover (MIH) user layer unit, adapted to obtain the power information, determine a handover policy according to the power information from the MIHF unit; and register with the MIH layer a power event carrying a power threshold of a device;
wherein the information carried in the power event comprises: source that triggers the event, media access control (MAC) address of the mobile device, predicted time interval from triggering a power event to complete power failure of the device, predicted probability of power failure of the device in the specified time interval; current power, and information about the network interfaces incompliant with the current power requirement.

22. The apparatus of claim 21, further comprising:
a network management entity, adapted to receive a threshold value from the MIHF unit, and provide power status information and/or power status notification for the MIHF unit when the power of a lower-layer device drops below the threshold;
the MIHF unit is further adapted to send the threshold value in the Register request of the MIH user layer unit to the network management entity; query the power status notification and/or power status information in the network management entity, or receive the power status notification and/or power status information from the network management entity; trigger a power event according to the power status notification and send power status information to the MIH user layer unit; and the MIH user layer unit is further adapted to send a Register request containing the power threshold value to the MIHF unit and receive the power status information from the MIHF unit.

23. The apparatus of any of claims 22, wherein the MIHF unit is further adapted to deregister the power event corresponding to the deregister request sent from the MIH user layer unit, and send a deregister confirm message to the MIH user layer unit; and the MIH user layer unit is further adapted to send a deregister request to the MIHF unit; and receive the deregister confirm message from the MIHF unit.

24. The apparatus of claim 21, further comprising:

a link layer unit, adapted to register a link-going-down event for the MIHF according to a Register request from the MIHF unit, and send a Register Confirm message to the MIHF unit; trigger a link-going-down event to the MIHF when a lower link layer detects that the remaining power is not enough for keeping a current link, and send the link-going-down event containing the power information to the MIHF unit;

the MIHF unit is adapted to send the Register request to the link layer unit according to the Register request from the MIH user layer unit, requesting to register the link-going-down event; receive the Register Confirm message from the link layer unit; and send the link-going-down event to the MIH user layer unit according to the power information from the link layer unit; and the MIH user layer unit is adapted to confirm the power status of the lower-layer device according to the link-going-down event from the MIHF unit, and determine the handover policy.

25. The apparatus of any of claims 24, wherein the MIHF unit is further adapted to deregister the power event corresponding to the deregister request sent from the MIH user layer unit, and send a deregister confirm message to the MIH user layer unit; and the MIH user layer unit is further adapted to send a deregister request to the MIHF unit; and receive the deregister confirm message from the MIHF unit.

26. The apparatus of claim 21, further comprising:

a management entity, adapted to provide a power status and/or power status notification for the MIHF unit;

the MIHF unit is adapted to send a link-going-down event to the MIH user layer unit according to the power information from the network management entity; and the MIH user layer unit is adapted to confirm the power status of the lower-layer device according to the link-going-down event from the MIHF unit, and determine the handover policy.

27. The apparatus of any of claims 26, wherein the MIHF unit is further adapted to deregister the power event corresponding to the deregister request sent from the MIH user layer unit, and send a deregister confirm message to the MIH user layer unit; and the MIH user layer unit is further adapted to send a deregister request to the MIHF unit; and receive the deregister confirm message from the MIHF unit.

* * * * *